(12) United States Patent
Salignon et al.

(10) Patent No.: US 8,257,521 B2
(45) Date of Patent: Sep. 4, 2012

(54) PROPELLANT DEVICE OF ENHANCED PERFORMANCE

(75) Inventors: Denis Salignon, Orleans (FR); Claude Perthuis, Orleans (FR); Thierry Bouet, Orleans (FR); Christophe Riviere, Olivet (FR)

(73) Assignee: Thales, Neuilly sur seine (FR)

( * ) Notice: Subject to any disclaimer, the term of this patent is extended or adjusted under 35 U.S.C. 154(b) by 243 days.

(21) Appl. No.: 12/602,380

(22) PCT Filed: Jun. 4, 2008

(86) PCT No.: PCT/EP2008/056897
§ 371 (c)(1),
(2), (4) Date: Nov. 30, 2009

(87) PCT Pub. No.: WO2008/155221
PCT Pub. Date: Dec. 24, 2008

(65) Prior Publication Data
US 2010/0175367 A1    Jul. 15, 2010

(30) Foreign Application Priority Data
Jun. 8, 2007    (FR) ..................... 07 04115

(51) Int. Cl.
*C06B 45/00*    (2006.01)
*C06B 45/12*    (2006.01)
*C06B 33/00*    (2006.01)
*C06B 25/00*    (2006.01)
*D03D 23/00*    (2006.01)
*D03D 43/00*    (2006.01)

(52) U.S. Cl. ................... 149/2; 149/14; 149/37; 149/88; 149/109.4

(58) Field of Classification Search ............... 149/2, 14, 149/37, 88, 109.4
See application file for complete search history.

(56) References Cited

U.S. PATENT DOCUMENTS

| | | | |
|---|---|---|---|
| 3,324,795 A * | 6/1967 | Miles et al. | 102/289 |
| 3,718,095 A * | 2/1973 | Munger et al. | 60/253 |
| 5,723,811 A * | 3/1998 | Bouet et al. | 102/476 |
| 6,502,512 B2 * | 1/2003 | Riviere et al. | 102/202.7 |
| 2007/0113939 A1 * | 5/2007 | Chan et al. | 149/19.3 |
| 2008/0314278 A1 * | 12/2008 | Salignon et al. | 102/374 |

FOREIGN PATENT DOCUMENTS

| | | |
|---|---|---|
| JP | 55107039 A | 8/1980 |
| WO | 0114705 A1 | 3/2001 |
| WO | 02095207 A1 | 11/2002 |

* cited by examiner

*Primary Examiner* — James McDonough
(74) *Attorney, Agent, or Firm* — Stroock & Stroock & Lavan LLP

(57) ABSTRACT

The present invention relates to the field of propellant devices and more particularly to the propellant devices used in weapon systems and munitions. The invention has the two advantages of minimizing the risk associated with accidental attack to which propellant devices may be exposed thanks to the filling of the central channel commonly provided along the core of the cylindrical explosive charge and of greatly increasing the effectiveness of these propellant charges by the use of explosive materials having a very high burn rate.

3 Claims, 3 Drawing Sheets

PROPELLANT DEVICE OF ENHANCED PERFORMANCE

CROSS REFERENCE TO RELATED APPLICATIONS

The present application is the U.S. National Phase of International Patent Application Serial No. PCT/EP2008/056897, filed on Jun. 4, 2008, which claims the benefit of French Patent Application Serial No. 0704115, filed on Jun. 8, 2007, both of which are hereby incorporated by reference in their entireties.

TECHNICAL FIELD

The present invention relates to the field of propellant devices and more particularly to the propellant devices used in weapon systems and munitions.

BACKGROUND OF THE INVENTION

Currently, in the field of the production of propellant devices, notably for munitions, explosive materials having burn rates ranging from a few millimeters to a few tens of millimeters per second are used. Given that the objective of a propellant device is to deliver a maximum impulse in a bore of a given caliber, it is conventional to seek to increase the explosive burn area of the propellant device. As a consequence, the mass flow rate of burnt explosive material, which corresponds directly to the impulse created by the propellant device, is proportionately increased. Specifically, the mass flow rate $D_m$ of a material having a burn velocity $V_c$, a density $\rho$ and a burn area S satisfies the following equation: $D_m = V_c \times \rho \times S$. This mass flow rate $D_m$ is directly proportional to the force generating the vector displacement. The impulse is then the integral of this force over the time during which it is exerted.

To increase the explosive burn area of the propellant device, it is general practice to have a central channel along the core of the explosive charge of the propellant device. This central channel enables the explosive burn area to be substantially increased.

However, this standard technique has two major drawbacks. Firstly, the central channel provided along the core of the explosive charge of the propellant device weakens the latter when exposed to accidental external attack. This sensitivity of propellant devices, and therefore potentially of the munitions of which they form part, is well known, particularly as regards attacks such as "heavy/light fragments". Such attacks and the associated reactions are modeled and grouped under the name "channel effect".

In general, as regards munitions, most countries evaluate and classify their reactions with respect to standard types of attack and establish standards for the purpose of possessing only low-risk munitions. One of the major objectives when developing new munitions is therefore in particular to minimize the risk of a violent reaction of these munitions to accidental external attack. The channel effect tends to increase the violence of munition reactions with respect to such attacks, which constitutes a serious problem.

The second major drawback associated with the current technique lies in the reduction in specific energy efficiency per unit volume. This is because, quite obviously, the provision of a central channel in a propellant device, although it clearly does increase the impulse thereof, it also increases the volume by increasing the height for a given mass of propellant.

The aim of the invention is in particular to alleviate the afore-mentioned major drawbacks. The invention therefore makes it possible to increase, for a constant volume, the impulse of a propellant device while reducing the risk of violent reaction to external accidental attack by eliminating the channel effect of the current propellant devices.

SUMMARY OF THE INVENTION

For this purpose, one subject of the invention is a propellant device comprising a cylindrical explosive, consisting of a central channel and a peripheral secondary explosive charge having a secondary burn rate, characterized in that said central channel is filled with a primary explosive charge, consisting of materials having nanostructures based on $Fe_2O_3$ doped with aluminum and/or with hexogen for example, and having a primary burn rate of 10 to 100 times higher than the secondary burn rate, said propellant device consequently not being exposed to the risk of a "channel effect".

Advantageously, the secondary explosive charge is coated with an inhibitor that completely erodes away during combustion of the primary explosive charge, over a time close to but shorter than or equal to the duration of combustion of said primary explosive charge.

Advantageously, the secondary explosive charge is a propellant.

Advantageously, the method of initiating a propellant device according to the invention comprises the following steps:
"cigarette" combustion initiation of the primary explosive charge at the primary burn rate; and
after combustion of practically all the primary explosive charge, combustion of the secondary explosive charge at the secondary burn rate on all its surfaces freed by the combustion of the primary explosive charge.

Advantageously, the combustion of the primary explosive charge at the primary burn rate and the combustion of the secondary explosive charge at the secondary burn rate have the same mass flow rate of burnt explosive material.

Advantageously, the primary explosive charge is initiated by means of hot wires.

Advantageously, the primary explosive charge is initiated by means of a laser flash.

Advantageously, the secondary explosive charge is initiated by the burning of the primary explosive charge.

BRIEF DESCRIPTION OF THE DRAWINGS

Other features and advantages of the invention will become apparent from the description given with respect to the appended drawings which show.

DETAILED DESCRIPTION OF THE INVENTION

Figure 1:
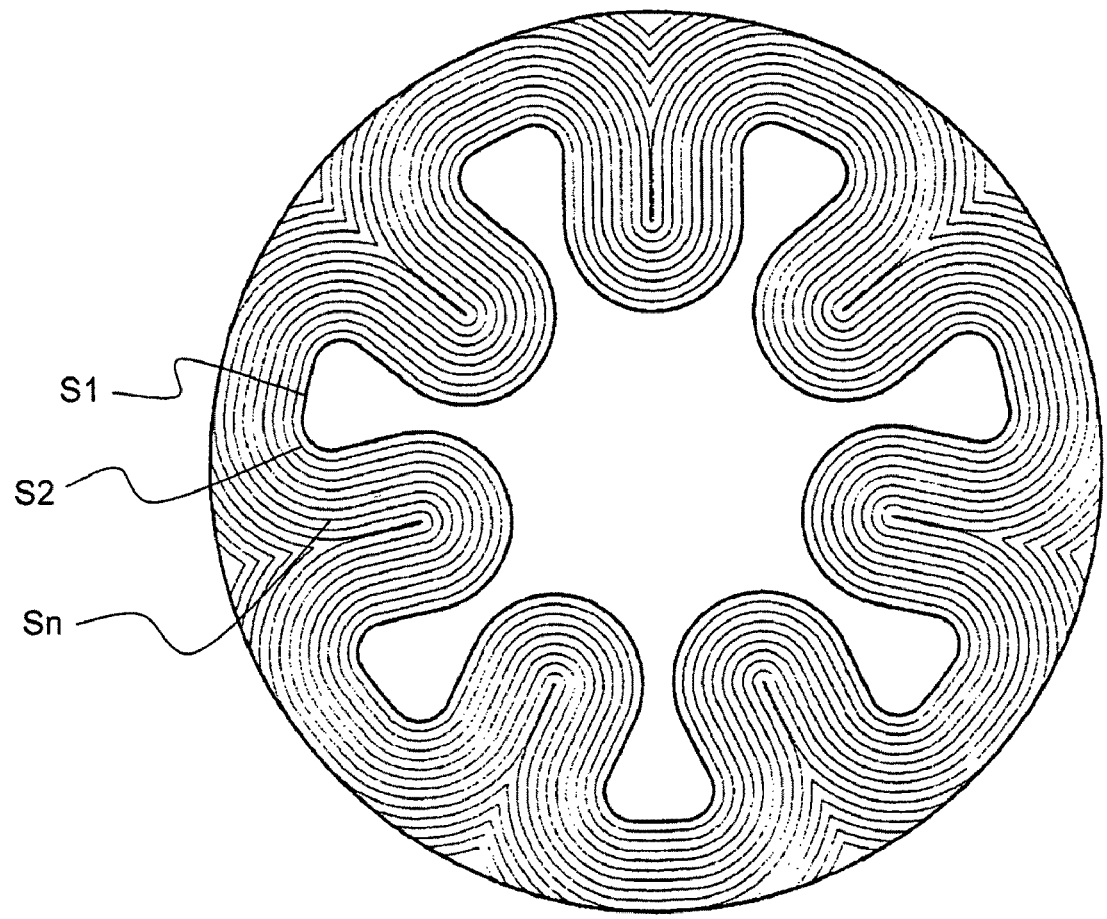
FIG. 1: a diagram of a cross section through an explosive charge in a propellant device of the known art.

FIG. 1 shows schematically the principle of maximizing the burn area of an explosive charge and of implementing constancy of this area. Specifically, as explained above, the maximum impulse that it is desired to produce is directly proportional to the mass flow rate of burnt explosive material and therefore to the burn area of said explosive material. Moreover, for the duration of the pulse, the latter has to be stable. The mass flow rate of burnt explosive material must be constant, which means that the burn area must be constant. In FIG. 1, it may be seen that, for this purpose, in the known art, explosive charges are designed that have a central channel in the form of a type of extruded "star". Thus, the burn area S1 becomes the burn area S2, where S1 equals S2. Likewise, as the explosive material continues to burn, the burn area becomes Sn, where again Sn is equal to S1 and to S2, and so on.

It is in this way, in the prior art, that the maximum impulse and a constant mass flow rate of burnt explosive material are generally maintained in the current propellant devices.

Figure 2:
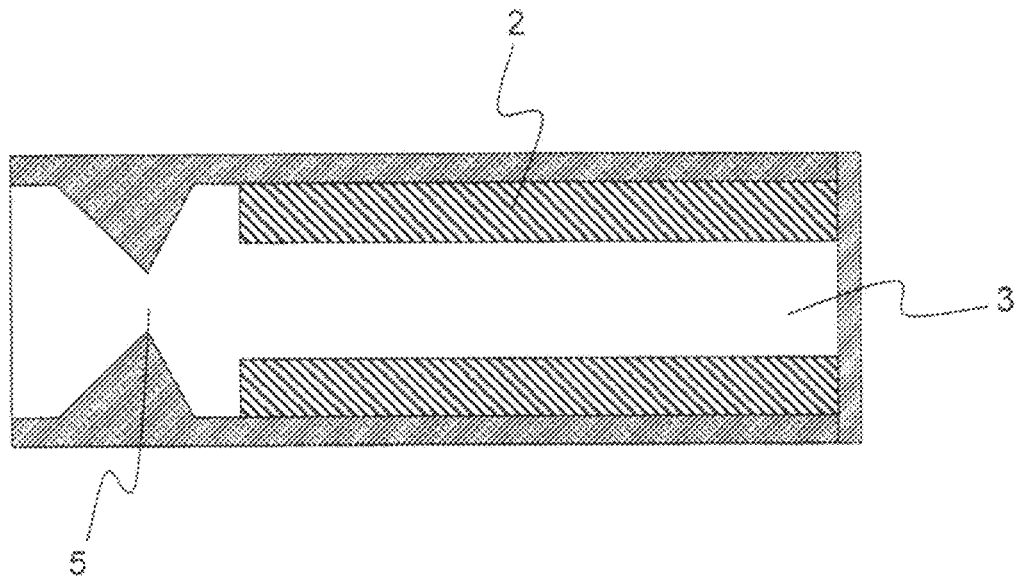
FIG. 2: a simplified diagram of a propellant device according to the known art.

FIG. 2 illustrates very schematically a propellant device of the known art. This cylindrical propellant device comprises a peripheral explosive charge 1 along the core of which a central channel 3 is provided. The explosive charge 1 burns with a constant area, according to the principle described in FIG. 1. The mass flow rate of gas escaping from the cylindrical explosive charge via the throat 5 is therefore constant. Thus, the impulse generated is high because of the large burn area and stable because of its constancy.

However, the empty space of the central channel 3 provided along the center of the explosive charge 1 weakens the cylindrical explosive charge of the propellant device, notably with respect to heavy/light fragments. This is because, following an impact of such a fragment, the shock wave generated tends to propagate on either side of the impact over the circumference of the cylindrical explosive charge as it cannot be absorbed along the axis of the impact because of the empty space of the central channel 3. This phenomenon weakens the shell of the cylindrical explosive charge, making it easier to be torn off.

This type of reaction forms part of what is called the "channel effect", mentioned above.

Figure 3:
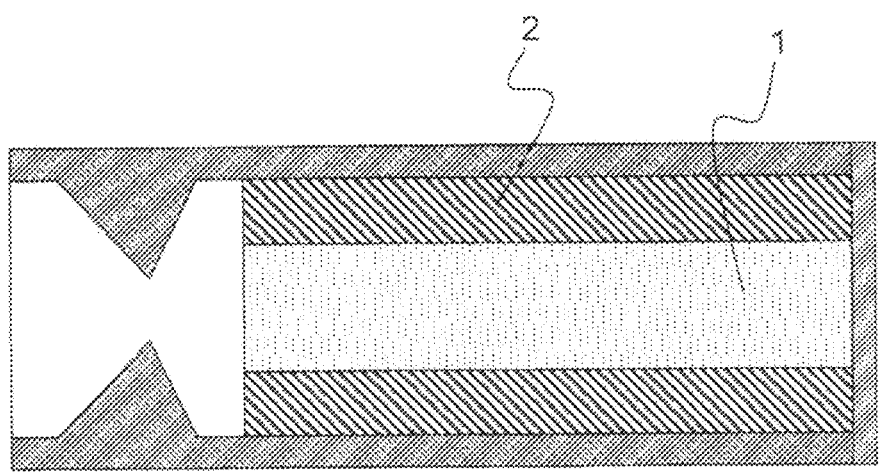
FIG. 3: a simplified diagram of a propellant device according to the invention.

FIG. 3 shows a first schematic illustration of the principle of the invention, made possible by the appearance of explosive materials having burn rates of 3 to 7 meters per second, i.e. 10 to 100 times higher than those of current explosive materials. These materials consist of nanostructures based on $Fe_2O_3$ doped with aluminum or with hexogen for example. Such nano-explosive materials are obtained as a result of chemical reactions called nanostructured reactions. These explosive nanomaterials have density ranges going from 0.5 to 10 times that of standard explosive materials and burn rates ranging from 0.1 centimeters to 7 meters per second. In the invention, these explosive materials having a very high burn rate are used to fill the central channel 3 of a primary explosive charge 1. This insertion of a primary explosive charge 1 in the central channel 3 of the secondary explosive charge 2 eliminates de facto the channel effect described above and therefore reduces the effects of "heavy/light fragment" attack.

Figure 4:
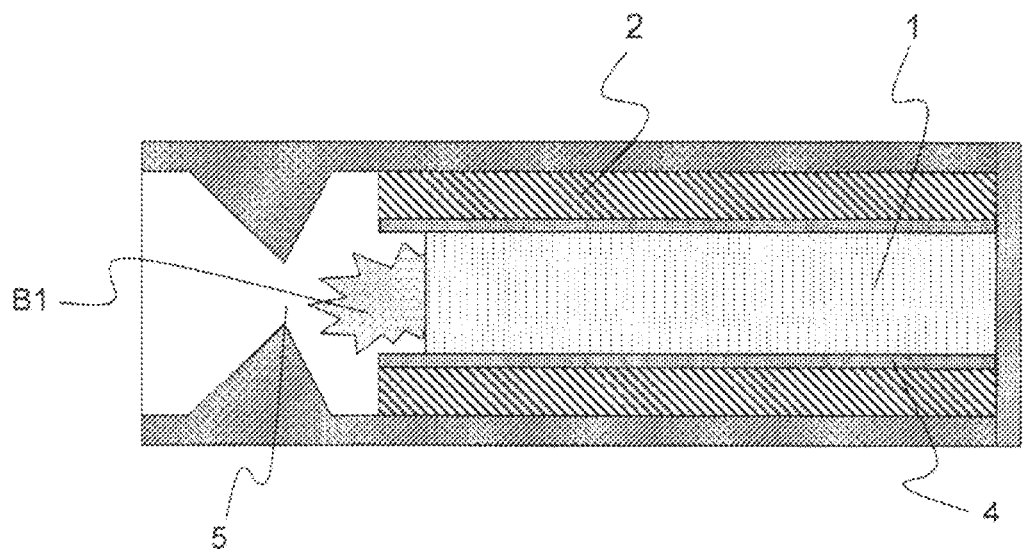
FIG. 4: an illustration of the burning of the primary explosive charge of a propellant device according to the invention.

FIG. 4 shows the first operating phase of the propellant device according to the invention. The secondary explosive charge 2, located on the periphery of the cylindrical explosive charge, is here covered with an inhibitor 4. However, the presence of this inhibiter may be optional owing to the ratio of the burn rates of the primary explosive charge 1 and secondary explosive charge 2. This is because, given the very high burn rate of the primary explosive charge 1, the latter can burn completely before the secondary explosive charge 2 has started to burn, even in the absence of a specific inhibitor. However, in most cases, it is nevertheless preferable to opt for a configuration in which the inhibitor 4 is present. This explosive charge 2 may typically consist of an SD 1136 double-base propellant sold for example by the company SME-Propulsion. The primary explosive charge 1 is initiated for example by hot wires or by a laser flash. Its cigarette combustion takes place at a rate of a few meters per second. Over a duration close to but less than or equal to the duration of combustion of the explosive charge 1, the inhibitor 4 is eroded away, enabling the explosive charge 2 to be initiated, for example during the conclusion of combustion of the explosive charge 1. The burning B1 of the explosive charge 1 generates a mass flow rate $D_m$ at the throat 5.

Figure 5:
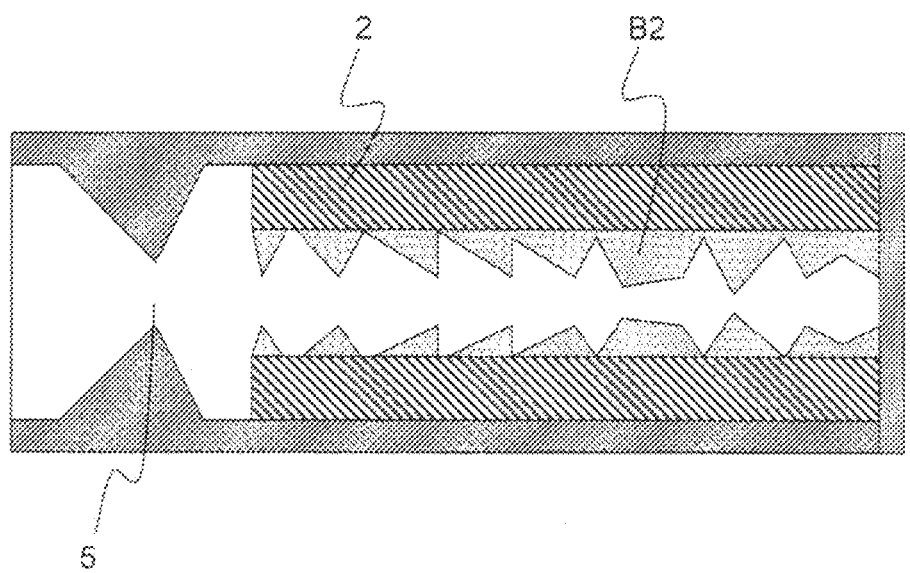
FIG. 5: an illustration of the burning of the secondary explosive charge of a propellant device according to the invention.

FIG. 5 shows the second operating phase of the propellant according to the invention. As the rapid combustion of the explosive charge 1 has been completed, the combustion of the explosive charge 2 is initiated. The burn rate of this secondary explosive charge is of the order of a few millimeters to a few tens of millimeters per second. However, the burning B2 of the explosive charge 2 generates the same mass flow rate $D_m$ of burnt material propelled via the throat 5 because of the high burn area.

By keeping the mass flow rate $D_m$ at the throat 5 constant, it is possible to obtain a constant impulse for the propellant device, whether during the combustion phase of the primary explosive charge 1 or during that of the secondary explosive charge 2.

To summarize, the invention has two major advantages, namely that of minimizing the risk associated with accidental attack to which propellant devices may be subjected thanks to the filling of the central channel commonly provided along the core of the cylindrical explosive charge and of greatly increasing the effectiveness of these propellant devices by the use of explosive materials having a very high burn rate.

Specifically, thanks to the difference in burn rate between the primary explosive charge and the secondary explosive charge, it is possible to create "dynamically" the future central channel of the secondary explosive charge while still benefiting from the impulse created by the combustion of the primary charge. Such an architecture makes it possible for the stored energy per unit volume to be greatly increased.

The theoretical increase in impulse, i.e. the increase in the impulse of a modified propellant according to the invention compared with the impulse of a propellant device according to the prior art, calculated on the basis of a current propellant device GSD4-G1 from the company TDA Armements SAS (Thomson Dasa Armement, a company of the Thales group), is around 40%.

The invention claimed is:

1. A propellant device comprising a throat and a peripheral secondary propellant having a secondary burn rate, the peripheral secondary propellant having a central channel, wherein the central channel is filled with a primary propellant comprising materials having nanostructures based on $Fe_2O_3$ doped with aluminum or with hexogen, and having a primary burn rate of 10 to 100 times higher than the secondary burn rate, combustion products from the secondary propellant and the primary propellant passing through the throat to generate an impulse for the propellant device.

2. The propellant device as claimed in claim 1, wherein an inhibitor is disposed between the secondary propellant and the primary propellant that erodes away during combustion of the primary propellant, over a time shorter than or equal to a duration of combustion of the primary propellant.

3. The propellant device as claimed in claim 1, wherein the primary propellant is configured to generate a mass flow rate through the throat that is substantially equal to a mass flow rate through the throat generated by the secondary propellant.

* * * * *